United States Patent [19]
Nii et al.

[11] Patent Number: 4,938,611
[45] Date of Patent: Jul. 3, 1990

[54] BEARING APPARATUS

[75] Inventors: Katsutoshi Nii, Hitachi; Kazuhiko Kawaike, Katsuta; Hiroo Hiroyama; Satoshi Uno, both of Hitachi, all of Japan

[73] Assignee: Hitachi, Ltd., Tokyo, Japan

[21] Appl. No.: 368,836

[22] Filed: Jun. 20, 1989

[30] Foreign Application Priority Data

Jun. 22, 1988 [JP] Japan .................. 63-152333

[51] Int. Cl.⁵ .................. F16C 33/82; F16C 32/06
[52] U.S. Cl. .................. 384/133; 384/107
[58] Field of Search .............. 384/100, 107, 397, 415, 384/446, 132, 133

[56] References Cited

U.S. PATENT DOCUMENTS

| | | | |
|---|---|---|---|
| 4,526,484 | 7/1985 | Stahl et al. | 384/133 |
| 4,598,914 | 7/1986 | Furumura et al. | 384/133 X |
| 4,630,943 | 12/1986 | Stahl et al. | 384/133 |
| 4,734,606 | 3/1988 | Hajec | 384/133 X |
| 4,809,354 | 2/1989 | Kawashima | 384/133 X |
| 4,817,964 | 4/1989 | Black, Jr. | 384/133 X |

FOREIGN PATENT DOCUMENTS

| | | |
|---|---|---|
| 139559 | 10/1980 | Japan . |
| 147117 | 8/1984 | Japan . |
| 88223 | 5/1985 | Japan . |
| 270520 | 11/1986 | Japan . |

OTHER PUBLICATIONS

"Tribology", p. 20, Mar., 1988 (Japanese).

Primary Examiner—Thomas R. Hannon
Attorney, Agent, or Firm—Antonelli, Terry, Stout & Kraus

[57] ABSTRACT

A bearing apparatus comprises a housing formed of a non-magnetizable material and having a bottom portion, a fluid lubricating type radial bearing device provided coaxial with the housing and having a magnetic fluid sealing section and a radial bearing section, a thrust bearing device provided at the bottom portion of the housing, and a rotating shaft of a permeable material rotatably supported by the radial bearing device and thr thrust bearing device to extend through the radial bearing device. The magnetic fluid sealing section is disposed on the opening side of the housing with a predetermined spacing away from the radial bearing section whereby a space is provided between the magnetic fluid sealing section and a liquid surface of fluid lubricant filled in the radial bearing section.

20 Claims, 5 Drawing Sheets

BEARING APPARATUS

BACKGROUND OF THE INVENTION

This invention relates to a bearing apparatus which uses a fluid lubricant such as a lubricating oil, a magnetic fluid and, the like, and more particularly, to a bearing apparatus suitable for use in a polygon mirror drive motor for laser beam printers or a motor for magnetic disk equipments, VTR and the like, which motor is required to exhibit a high rotational accuracy with a minimum of shaft whirling.

Recently, high speeds and high accuracy rotation with less shaft whirling are required of drive motors of the above type in the aspect of highly minute images and highly densed memory. In particular, a clean bearing apparatus adapted for "high accuracy rotation" and free from oil contamination are desired in laser beam printers and magnetic disk equipment.

With respect to such demands, problems relating to rotational accuracy and to contamination of main machines are directly related to performances of a bearing apparatus. In this respect, conventional ball bearings have limitations on high speeds and accuracy of rotation as a result of the accuracy in working rolling members and inner and outer races. For this reason, fluid-lubricated plain bearings have been employed as bearings which are effective in high speed rotation and enabling "high accuracy rotation", and various improvements have been made on such plain bearings for use in motors of the above type.

In a plain bearing, a fluid lubricant film formed on sliding surfaces upon rotation of a shaft maintains a shaft and a bearing in non-contact condition to rotatably support the shaft, and oil or gas is used as a lubricant. Unlike a gas bearing, a plain bearing making use of a lubricating oil is not expected to involve low torque, but provides an oil film of high rigidity which attains "high accuracy rotation" with less shaft whirling. Accordingly, such plain bearing can be designed to be of a small diameter as compared with a gas bearing, thus enabling a realization of a compact motor. However, in a plain bearing making use of a lubricating oil, oil leakage is always problematic, and dispersion of oil during high speed rotation poses a problem in the practical use of polygon mirror drive motors and magnetic disk spindle drive motors.

To cope with this problem, a magnetic fluid bearing has been proposed for use in drive motors of the above type including permanent magnet and a magnetic fluid with the magnetic fluid having a sealing function and providing lubrication. The magnetic fluid is formed by treating magnetic powders with a surface active agent and dispersing the same in a base oil. There are two types of magnetic fluid bearings classified in a basic construction. One type of magnetic fluid bearing retains a magnetic fluid on sliding bearing surfaces by magnetizing the same by a cylindrical-shaped permanent magnet, as disclosed in, for example, Japanese Patent Unexamined Publications Nos. 55-139559 and 59-147117. The other type of magnetic fluid bearing has a permanent magnet arranged at an end of the bearing and the permanent magnet and a permeable rotating shaft constitute a magnetic fluid sealing to have a magnetic fluid filled in a bearing section for lubrication, as disclosed in, for example, Japanese Patent Unexamined Publications Nos. 61-270520 and 60-88223. These two types of magnetic fluid bearings are intended for the prevention of dispersion of a magnetic fluid by magnetizing and providing the same with a sealing function, and are designed to increase magnetic flux density for sealing. In these prior bearings, a magnetic fluid is disadvantageously dispersed due to increased centrifugal forces upon rotation of high speeds if an amount of magnetic fluid as retained is slightly more than as required. Even if an amount of magnetic fluid as retained is appropriate, the magnetic fluid tends to be dispersed in the range of high rotational speeds due to cubical expansion produced by temperature rise since the magnetic fluid has a considerably large, thermal expansion coefficient as compared with constituent materials of the bearing, as described in the monthly magazine "Tribology" page 20, March 1988. In addition, there is a possibility of deterioration of a magnetic fluid when used at high temperatures. That is, as described in "Tribology" page 15, a surface active agent tends to separate from the magnetic powders when exposed to high temperatures, so that the magnetic powders will cohere to mar dispersion. In particular, in the case of a plain bearing, an eccentric load produced by centrifugal forces are applied on sliding surfaces to increase viscous shearing stresses on the lubricant film, unlike a magnetic fluid sealing. In addition, as rotational speeds are increased, a shear velocity becomes high to increase the density of generation of heat due to viscous friction, so that the surface active agent is separated from the magnetic powders to cause deterioration of the bearing performance. Therefore, thermal measures such as cooling are necessary in case a magnetic fluid is used as a sealing or lubricating fluid in high speeds.

SUMMARY OF THE INVENTION

It is an object of the invention to solve the above-mentioned problems of the prior art.

It is another object of the invention to provide a bearing apparatus which is effective in rotation of high speeds and high accuracy and is improved in durability and sealing performance. In accordance with advantageous features of the present invention, a magnetic fluid sealing which constitutes a bearing apparatus is spaced away from a bearing section to provide therebetween a space which accommodates a cubical expansion of a lubricant and maintains a constant amount of a magnetic fluid in a magnetic fluid sealing section to prevent dispersion of the magnetic fluid upon rotation of high speeds. In addition, deterioration of performance due to temperature rise accompanied by viscous shearing of the magnetic fluid is prevented by providing a mechanism for circulating the magnetic fluid through making use of shaft rotation.

The present invention provides a bearing apparatus comprising a housing formed of a non-magnetizable material and having a bottom portion, a fluid lubricating type radial bearing means provided coaxial with housing and having a magnetic fluid sealing section and a radial bearing section, with a thrust bearing means provided at the bottom portion of said housing. A rotating shaft of a permeable material is rotatably supported by radial bearing means and thrust bearing means to extend through the radial bearing means, and the magnetic fluid sealing section is disposed on the opening side of the housing with a predetermined spacing away from the radial bearing section whereby a space is provided between the magnetic fluid sealing section and a liquid surface of fluid lubricant filled in the radial bearing section.

DESCRIPTION OF THE PREFERRED EMBODIMENTS

Figure 1:
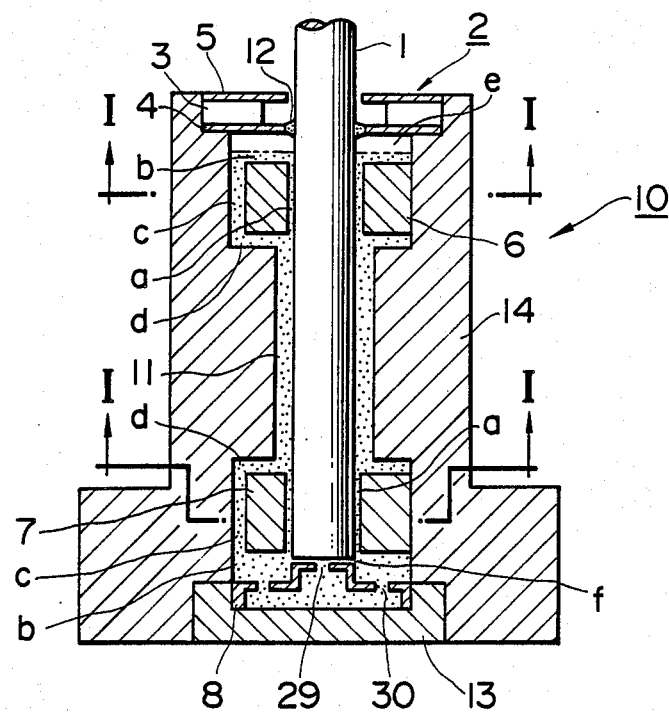
FIG. 1 is a longitudinal cross-sectional view of a bearing apparatus according to a first embodiment of the invention.

Referring to FIG. 1, a bearing apparatus 10 includes a bearing housing 14, a magnetic fluid sealing section generally designated by the reference numeral 2, a first radial bearing 6, a second radial bearing 7, a thrust bearing 8 and a fluid lubricant 11 which completely fills one end of the bearing apparatus 10. The magnetic fluid sealing section 2 includes a permanent magnet 3, a pole piece 4, a cover 5 and a magnetic fluid 12 with the permanent magnet 3, pole piece 4 and cover 5 being coaxial with the bearing housing 14. The magnetic fluid sealing section 2 is securedly mounted on an open end of the bearing housing 14 so as to be spaced from the first radial bearing 6 by a distance e. The fluid lubricant 11 for the first and second radial bearings 6,7 and the thrust bearing 8 may be the same as the magnetic fluid 12 for the magnetic fluid sealing section 2 or a magnetic fluid of a different composition or a lubricant such as a lubricating oil.

Figure 2:
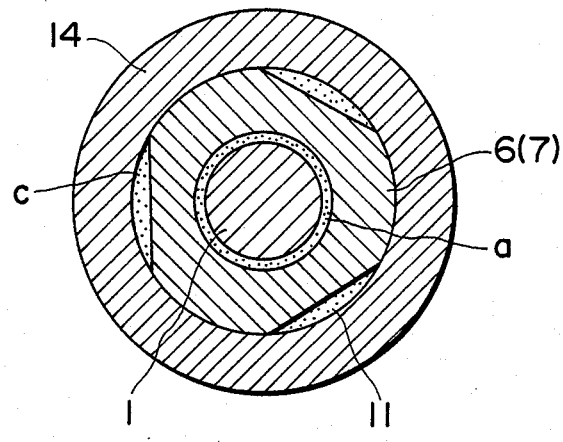
FIG. 2 is a cross-sectional view taken along the line I—I of FIG. 1.

Passages a, b, c and d for the fluid lubricant are defined by the bearing housing 14, the first and second radial bearings 6, 7 and a rotating shaft 1. In FIG. 2, three axial passages c disposed around the radial bearing 6 or 7. However, one passage c may suffice. Instead of forming such passage c by cutting the outer periphery of the radial bearing, it may be constituted by a groove or grooves formed in the bearing housing 14.

Figure 3:
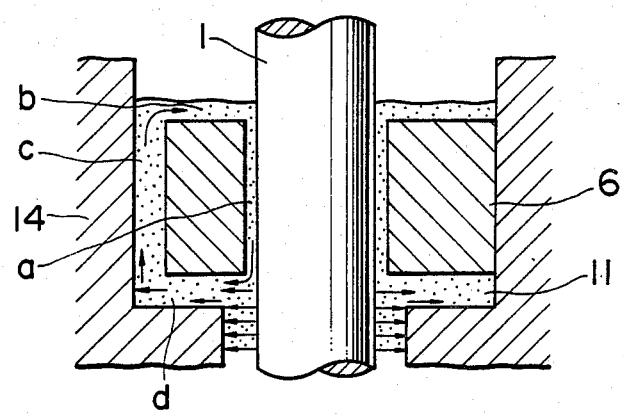
FIG. 3 is a cross-sectional view showing flow of a fluid lubricant in a radial bearing section in the first embodiment of the invention.
Figure 4:
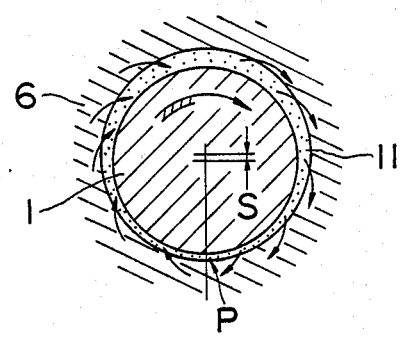
FIG. 4 is a transverse cross-sectional view showing the relationship between a rotating shaft and a bearing, and flow of a fluid lubricant.

As shown in FIG. 3, fluid lubricant 11 circulates about the radial bearing 6 in the bearing apparatus 10 according to the first embodiment of the invention, and, when the fluid lubricant 11 revolves upon rotation of the rotating shaft 1, the axial length of the passage b on one end of the radial bearing 6 becomes smaller than that of the passage d on the other end of the radial bearing 6. Accordingly, centrifugal forces applied to the fluid lubricant are larger in the passage d than in the passage b, so that the fluid lubricant 11 flows in a direction shown by an arrow in FIG. 3. As the rotating shaft 1 rotates with a small amount of eccentricity S (FIG. 4) relative to the radial bearing 6, a bearing clearance on the end surface of the radial bearing 6, that is, in the passage b is divergent in shape on the lefthand side of a point P (FIG. 4) where the fluid lubricant flows axially. Also, as the bearing clearance is convergent in shape on the righthand side of the point P in a clockwise direction, the fluid lubricant tends to flow axially toward the passage b but it generally flows in the passage a in a direction from the passage b to the passage d since the centrifugal forces are large in the passage d as compared with the forces in the passage b. Such flow is realized by the provision of the passages a, b, c and d. Accordingly, the fluid lubricant having been subjected to viscous shearing in the passage a to generate heat flows to the end surface of the radial bearing and circulates while discharging heat to the bearing housing 14 to be cooled. Thus, according to the invention, the fluid lubricant is not subjected to repeated viscous shearing in the bearing clearance or the passage a, so that a surface active agent will not separate from the magnetic powders, which are treated with the agent, for thermal reasons.

Figure 5:
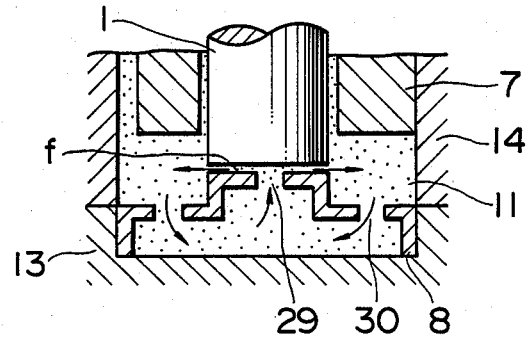
FIG. 5 is a cross-sectional view showing the construction of a thrust bearing and flow of a fluid lubricant in the first embodiment of the invention.

Referring now to FIG. 5, there is a circulating flow of the fluid lubricant in the thrust bearing 8 of the bearing apparatus according to the first embodiment of the invention. The thrust bearing 8 is formed at its central portion with a hole 29 and in the peripheral portion thereof with a plurality of holes 30. The central portion of the thrust bearing 8 faces the end surface of the rotating shaft 1. As the rotating shaft 1 rotates, a lubricant film f is formed on the sliding surface in the central portion of the thrust bearing 8, and the fluid lubricant flows radially outwardly. The fluid lubricant 11 circulates through the holes 29 and 30 in a direction shown by the arrows in FIG. 5. Thus, the fluid lubricant 11 is not subjected to repeated viscous shearing in an area between the end surface of the rotating shaft 1 and the central portion of the thrust bearing 8, but it circulates in the above-mentioned manner to improve lubrication on the sliding surface or the central portion of the thrust bearing 8. Without such hole 29, the sliding surface of the rotating shaft 1 is not supplied with any fluid lubricant, so that rotation of high speeds will cause poor lubrication to be resulted in seizure and wear.

Figure 6:
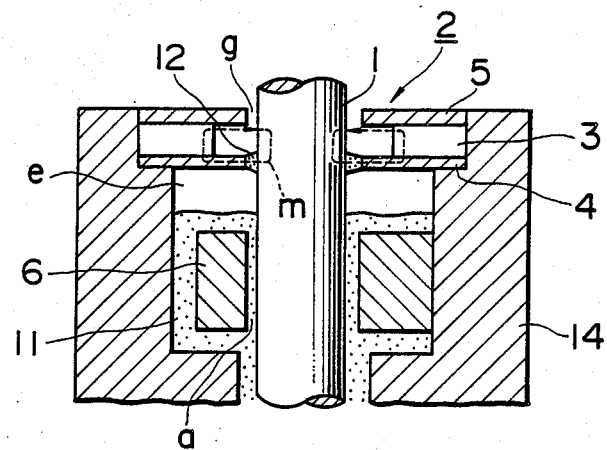
FIG. 6 is a longitudinal cross-sectional view of a magnetic fluid sealing in the first embodiment of the invention.

In FIG. 6, a magnetic fluid sealing 2 includes a magnetic circuit m shown by dotted lines formed by the permanent magnet 3 which is magnetized to be axially oriented, with the pole piece 4 being closely contacted by the permanent magnet, and the permeable rotating shaft 1. Magnetic flux density is increased in an area between the pole piece 4 and the rotating shaft 1, in which area a magnetic fluid 12 is retained to provide a magnetic fluid sealing. Also, a non-magnetizable disk or cover 5 is provided so that the magnetic fluid 12 will not flow out of the bearing housing 14 even when it is dispersed out of the magnetic fluid sealing section. The cover 5 is non-magnetizable so as not to define any magnetic circuit in a gap g between the cover 5 and the rotating shaft 1, so that even if the magnetic fluid 12 retained at the inner periphery of the pole piece 4 is dispersed, the fluid will be caught by the sealing portion of the pole piece 4 to maintain a regenerative function of the magnetic fluid sealing. Accordingly, if the gap g between the rotating shaft 1 and the cover 5 is set as small as possible, reduction of the magnetic fluid 12 caused by vaporization can be suppressed to eliminate environmental contamination produced by oil vapor even in long term use. In the present bearing apparatus, it is possible to suppress reduction of the magnetic fluid caused by vaporization by setting the size of the gap g equivalent to the bearing clearance, that is, the passage a or smaller than the gap g around the magnetic fluid sealing section, that is, the gap g between the rotating shaft 1 and the pole piece 4. Since there is a possibility of injuring the rotating shaft 1 due to oscillations and the like when the gap g is set equivalent to the bearing clearance, such injury to the rotating shaft 1 can be prevented by employing a lubricating copper alloy softer than the material of the rotating shaft 1 or a sliding material such as Teflon and nylon to form the cover.

In the present bearing apparatus, cubical expansion of the fluid lubricant 11 produced when the fluid lubricant 11 is subjected to thermal expansion caused by generation of heat due to viscous friction is accommodated by the space e. Thus the pressure within the space e is somewhat increased because a compressive gas is contained in the space e. However, such pressure is not raised to affect the sealing performance, so that dispersion of the magnetic fluid is avoided unlike the prior art. In addition, the provision of such space e enables making use of a lubricating oil for the magnetic fluid 12 and adjusting an amount of the fluid lubricant 11 in the permissible range determined by the space e without having to strictly control an amount of the magnetic fluid 12 retained by the gap g. This constitution is advantageous in terms of cost in the field of mass-produced motors of this type.

Figure 7:
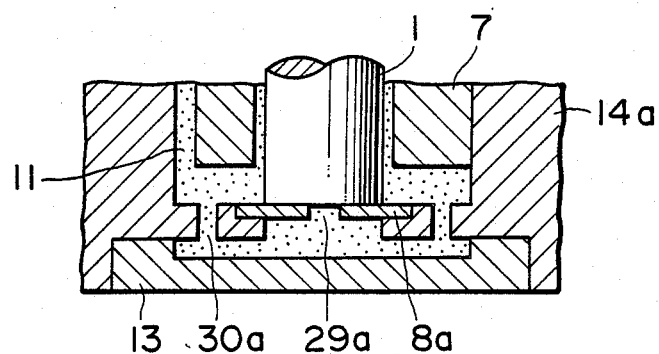
FIG. 7 is a longitudinal cross-sectional view of a thrust bearing in a second embodiment of the invention.

Referring to FIG. 7, there is partly shown a bearing apparatus according to a second embodiment of the invention, in which a hole 30a constituting a circulating mechanism of a thrust bearing 8a is formed in a bearing housing 14a.

Figure 8:
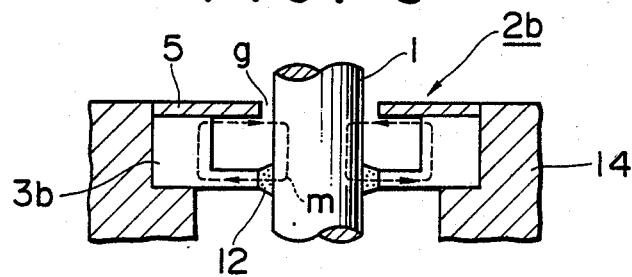
FIG. 8 is a longitudinal cross-sectional view of a magnetic fluid sealing in a third embodiment of the invention.

Referring to FIG. 8, a magnetic fluid sealing section 2b with a permanent magnet 3b has a shape in an axial cross-section without any pole piece. The magnetic fluid sealing section 2b functions in a manner equivalent to that shown in FIG. 6 while it is superior to the latter in that it has a less number of elements than the latter.

Figure 9:
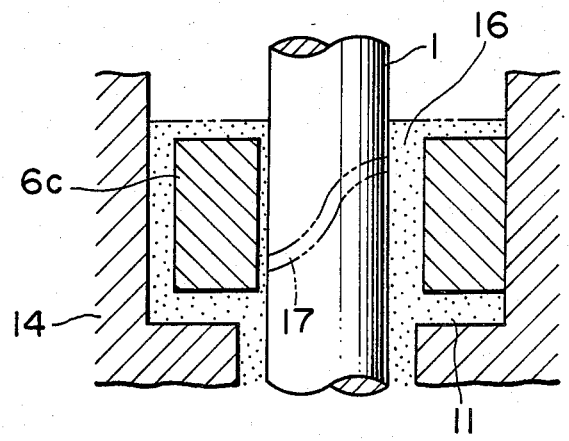
FIG. 9 is a longitudinal cross-sectional view showing a portion of a magnetic fluid circulating mechanism in a fourth embodiment of the invention.
Figure 10:
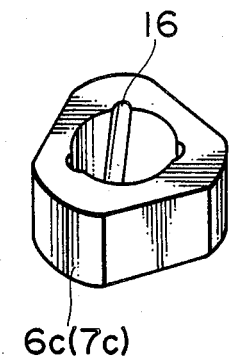
FIG. 10 is a perspective view of a radial bearing in the magnetic fluid circulating mechanism shown in FIG. 9.

Referring now to FIGS. 9 and 10, a groove (16 or 17) is formed in the rotating shaft 1 or a radial bearing (6c or 7c) to promote the circulating function of a circulating mechanism.

Figure 11:
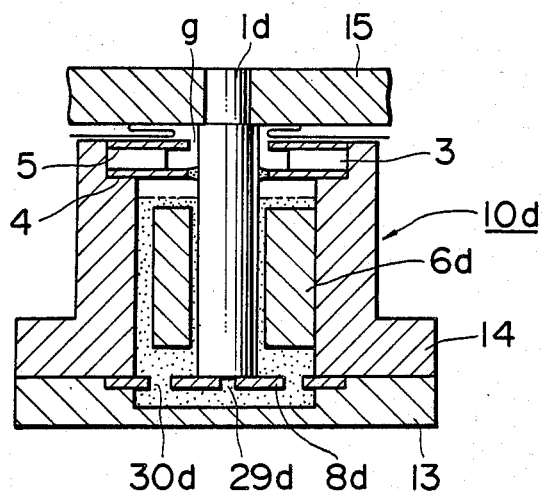
FIG. 11 is a longitudinal cross-sectional view of a bearing apparatus according to a fifth embodiment of the invention.

Referring to FIG. 11, bearing apparatus 10d includes a rotating shaft 1d rotatably supported by a single radial bearing 6d and a disk-shaped thrust bearing 8d. The rotating shaft 1d securedly mounts thereon a rotor 15 for a polygon mirror, disk, cylinder and the like, so that when the rotor 15 rotates, an air flow in a direction shown by an arrow is produced due to an action of fan between the cover 5 and the rotor 15. Without the cover 5, such air flow would tend to vaporize the magnetic fluid 12. However, such reduction of the magnetic fluid 12 caused by vaporization can be suppressed by making the gap g between the rotating shaft 1d and the cover 5 small.

Figure 12:
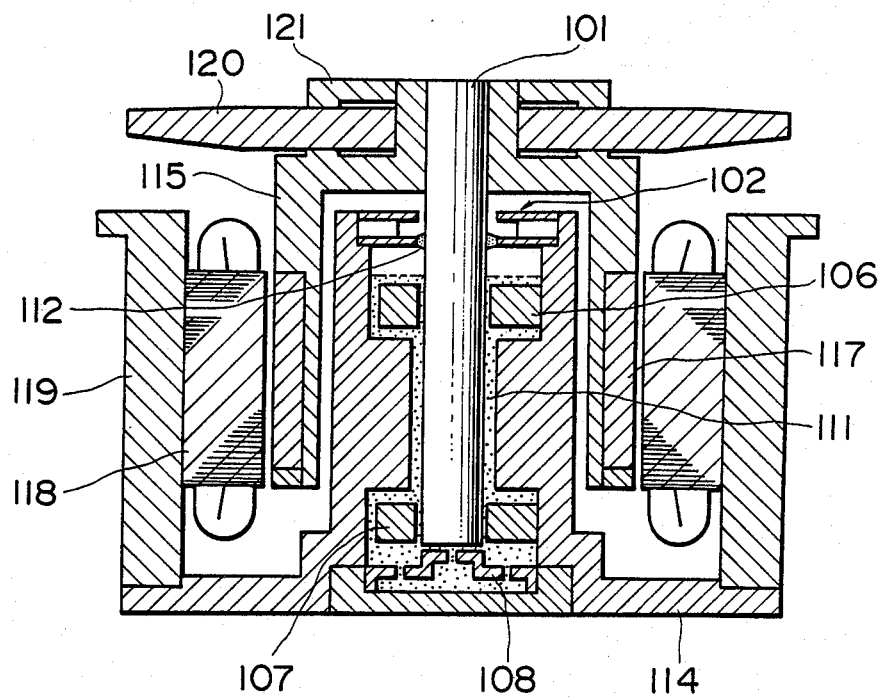
FIG. 12 is a longitudinal cross-sectional view of a polygon mirror drive motor, to which the invention is applied.

FIG. 12 shows a polygon mirror drive motor for laser printers wherein the motor comprises a motor rotor 117 formed of a permanent magnet and secured to a rotor 115, a motor stator 118 secured to a motor housing 119, a polygon mirror 120 securedly mounted on the rotor 115 by a mirror retainer 121, and a rotating shaft 101 press fitted into the rotor 115 and rotatably supported by a bearing apparatus. The bearing apparatus comprises a magnetic fluid sealing 102, radial bearings 106, 107, a thrust bearing 108 and a bearing housing 114. A predetermined amount of magnetic fluid 111 is filled in the bearing apparatus as a fluid lubricant to submerge the end surface of the upper radial bearing 106. A body of magnetic fluid 112 is provided by lifting the rotating shaft 101 having been inserted into the bearing housing so as to cause a portion of the magnetic fluid 111 adhering to the rotating shaft 101 to be retained in a gap between the magnetic fluid sealing 102 and the rotating shaft 101.

The polygon mirror drive motor thus constituted operates in the following manner. When the rotor 115 is driven at high speeds, the magnetic fluid 111 circulates in a flow passage on the sliding surfaces of the radial bearings 106, 107 and the thrust bearing 108 to ensure lubrication and cooling for stable rotation in a long term. Even when the rotation of the rotor 115 causes a temperature rise in the magnetic fluid 111 and hence a cubical expansion thereof, the magnetic fluid 111 will not overflow or disperse to contaminate the polygon mirror since the radial bearing 106 and the magnetic fluid sealing 102 are spaced away from each other to provide a space e. In the bearing apparatus of the invention, the magnetic fluid 111 performs a circulating flow to be improved in cooling, by which a surface active agent will not separate from magnetic powders treated therewith. Thus, the properties of the magnetic fluid 111 is maintained stable over a long period of time. Accordingly, when the bearing apparatus of the invention is applied on a polygon mirror drive motor, a rotor is rotatably supported by an oil film of high rigidity in a sliding bearing, so that shaft whirling is all but eliminated and rotation of high accuracy is maintained while a polygon mirror is free from contamination due to dispersion of a fluid lubricant. In this manner, the polygon mirror drive motor can be made reliable through application of the invention.

According to the invention, a magnetic fluid having a high saturation magnetization (that is, a large proportion of magnetic powders in a base oil) and a high viscosity is retained in a magnetic fluid sealing section, and a fluid lubricant of low viscosity or a magnetic fluid is filled in a bearing section, whereby bearing loss is reduced and cubical expansion is suppressed by a lowering of temperature rise to improve reliability of a magnetic fluid sealing. In addition, a circulating mechanism making use of rotation of a rotating shaft cooperates with a space between a magnetic fluid sealing and a bearing section to contribute to improvement of sealing performance and prevent deterioration of performance of a magnetic fluid sealing.

In the invention, the provision of a space between a bearing section and a magnetic fluid sealing section eliminates the need of strictly adjusting an amount of fluid lubricant filled into the bearing section to be very effective in reduction of cost in mass production. Furthermore, a fluid lubricant different from a magnetic fluid retained by a magnetic fluid sealing section can be filled in a bearing section, so that it is possible to use a fluid lubricant which meets a desired operating condition. In addition, a circulating mechanism for a fluid lubricant can prevent deterioration of performance of a magnetic fluid due to temperature rise even when a magnetic fluid is used for a fluid lubricant. Thus a bearing apparatus having durability and high reliability can be provided by the invention.

In a magnetic fluid sealing section, a non-magnetizable disk is provided on an open end of a bearing housing, and a gap defined between the disk and a rotating shaft is set to have the same size as that of a bearing clearance, whereby reduction of a magnetic fluid due to vaporization can be suppressed in the bearing apparatus to make the magnetic fluid durable. As described above, when the bearing apparatus of the invention is applied on a polygon mirror drive motor and a spindle drive motor for magnetic disk equipments, which motors are required of "high accuracy rotation" and cleanliness, it is possible to realize durability, high reliability and reduction in production cost.

What is claimed is:

1. A bearing apparatus comprising a housing formed of a non-magnetizable material and having a bottom portion;
a fluid lubricating type radial bearing means coaxially disposed with respect to said housing and having a magnetic fluid sealing section and a radial bearing section; a thrust bearing means provided at the bottom portion of said housing; and a rotating shaft of a permeable material rotatably supported by said radial bearing means and said thrust bearing means so as to extend through said radial bearing means; said magnetic fluid sealing section being disposed on and open side of said housing with a predetermined spacing away from said radial bearing section whereby a space is provided between said magnetic fluid sealing section and a liquid surface of fluid lubricant filled in said radial bearing section.

2. A bearing apparatus as set forth in claim 1, wherein said fluid lubricant filled in said radial bearing section is the same magnetic fluid as that in said magnetic fluid sealing section.

3. A bearing apparatus as set forth in one of claims 1 or 2, wherein said fluid lubricant filled in said radial bearing section is a magnetic fluid having a lower viscosity than that of the magnetic fluid in said magnetic fluid sealing section.

4. A bearing apparatus as set forth in claim 3, wherein the fluid lubricant circulates between opposite end surfaces of said radial bearing section.

5. A bearing apparatus as set forth in claim 4, wherein an area, at which a circulating passage of said fluid lubricant contacts with said rotating shaft, is larger around the lower end surface of said radial bearing section than around the upper end surface thereof.

6. A bearing apparatus as set forth in claim 5, further comprising a passage means extended between the opposite end surfaces of said radial bearing section for passing a fluid lubricant therethrough and provided on and outer periphery of said radial bearing section in communication with a bearing clearance between said radial bearing section and said rotating shaft.

7. A bearing apparatus as set forth in claim 6, wherein a surface opposite to a sliding surface of said thrust bearing section which bears an axial load of said rotating shaft cooperates with the bottom of said housing to define therebetween a chamber, and a passage means for the fluid lubricant is provided on central and outer peripheral portions of said sliding surface to communicate with said chamber.

8. A bearing apparatus as set forth in claim 7, further comprising at least one groove provided on one of the sliding surface of said radial bearing section or on the sliding surface of said rotating shaft to serve for circulation of the fluid lubricant.

9. A bearing apparatus as set forth in claim 8, wherein the fluid lubricant flows along the sliding surface of said radial bearing from the open side of said housing to the bottom thereof.

10. A bearing apparatus as set forth in claim 1, wherein said magnetic fluid sealing section disposed on the open side of said housing comprises a ring-shaped permanent magnet and a single pole piece.

11. A bearing apparatus as set forth in claim 10, further comprising a non-magnetizable disk, and wherein said pole piece is disposed on a side of said radial bearing section and said non-magnetizable disk is disposed on the open side of said housing such that said pole piece and said non-magnetizable disk are disposed in close proximity to said permanent magnet.

12. A bearing apparatus as set forth in claim 11, wherein a gap between said non-magnetizable disk and said rotating shaft is one of equal in size to a bearing clearance about said radial bearing section or smaller than a gap between said pole piece and said rotating shaft.

13. A bearing apparatus as set forth in claim 12, wherein said non-magnetizable disk is formed of a material having a lower hardness than that of a material which forms said rotating shaft.

14. A bearing apparatus as set forth in claim 10, wherein said permanent magnet is substantially L-shaped in axial section.

15. A bearing apparatus as set forth in one of claims 1 or 2, wherein the fluid lubricant circulates between opposite end surfaces of said radial bearing section.

16. A bearing apparatus as set forth in claim 15, wherein an area, at which a circulating passage of said fluid lubricant contacts with said rotating shaft, is larger around the lower end surface of said radial bearing section than around the upper end surface thereof.

17. A bearing apparatus as set forth in claim 16, further comprising passage means extending between the opposite end surfaces of said radial bearing section for passing therethrough a fluid lubricant and provided on an outer periphery of said radial bearing section and communication with a bearing clearance between said radial bearing section and said rotating shaft.

18. A bearing apparatus as set forth in claim 17, wherein a surface opposite to a sliding surface of said thrust bearing section which bears an axial load of said rotating shaft cooperates with the bottom of said housing to define therebetween a chamber, and a passage means for the fluid lubricant is provided on central and outer peripheral portions of said sliding surface to communicate with said chamber.

19. A bearing apparatus as set forth in claim 18, further comprising at least one groove provided on one of the sliding surface of said radial bearing section or on the sliding surface of said rotating shaft to serve for circulation of the fluid lubricant.

20. A bearing apparatus as set forth in claim 19, wherein the fluid lubricant flows along the sliding surface of said radial bearing section from the open side of said housing to the bottom thereof.

* * * * *